United States Patent [19]
Feldman

[11] Patent Number: 5,577,915
[45] Date of Patent: Nov. 26, 1996

[54] MOTIVATIONAL TASK TRACKING DEVICE

[76] Inventor: Dana H. Feldman, 12364 Oak Hollow Dr., St. Louis, Mo. 63141

[21] Appl. No.: 544,882

[22] Filed: Oct. 18, 1995

[51] Int. Cl.⁶ .............................. G09B 1/02; G09B 19/00
[52] U.S. Cl. ............................................ 434/238; 434/430
[58] Field of Search ................................ 434/236, 238, 434/430

[56] References Cited

U.S. PATENT DOCUMENTS

| | | | |
|---|---|---|---|
| 2,414,614 | 1/1947 | Shurick, Sr. | 434/238 |
| 2,863,603 | 12/1958 | Doupnik | 434/238 |
| 2,883,765 | 4/1959 | Blaine | 434/238 |
| 2,965,978 | 12/1960 | Olson . | |
| 3,035,355 | 5/1962 | Holmes | 434/238 |
| 3,290,796 | 12/1966 | Gurda . | |
| 3,782,009 | 1/1974 | Darnell | 434/238 |
| 4,226,420 | 10/1980 | Corday | 273/269 |
| 4,384,855 | 5/1983 | Walsh | 434/238 |
| 4,776,799 | 10/1988 | Walsh | 434/238 |
| 5,135,399 | 8/1992 | Ryan | 434/236 |
| 5,431,450 | 7/1995 | Coleman | 434/238 |

*Primary Examiner*—Paul J. Hirsch
*Attorney, Agent, or Firm*—Grace J. Fishel

[57] ABSTRACT

A motivational task tracking device that organizes chores, or other activities or things, into categories and provides an incentive system for their performance. The device has a plurality of cards representing activities or things in pictures and text for attachment to a sheet. The sheet has a chart with ranks and files, separated by white space to improve readability. The ranks are divided into different categories and the files represent time units over which performance is being tracked. Completion of the chores or other activities or things in the ranks is indicated by markings on the files.

8 Claims, 2 Drawing Sheets

MOTIVATIONAL TASK TRACKING DEVICE

BACKGROUND OF THE INVENTION

1. Field of the Invention

The present invention relates to a motivational task tracking device that can be used, for example, to organize chores into categories and provides an incentive system for their performance.

2. Brief Description of the Prior Art

All children should have chores, preferably starting at about three. In the beginning, the chores may be focused on personal hygiene, e.g., flushing the toilet, washing their hands and face, brushing their teeth, etc. In time, appropriate tasks include picking up their toys, making their bed, hanging up their clothes, and so forth, branching out to setting the table, folding laundry, etc., in due time.

There are several reasons why children should have chores. For one, working parents, particularly mothers, need help. More importantly, however, chores teach children life skills, provide them with a sense of accomplishment, and teach them about time management. The performance of chores provides parents and children with a win-win opportunity. What is lacking, however, is a system that is child-friendly that induces them to do their chores without being nagged to do so.

The earlier children start an organized program of chores, the better, as it is harder to start the habit later. Older children may be very difficult to train, particularly if their peers are not required to help, and, in consequence, older children may grow up with quite unrealistic expectations of what others will do for them. For that reason, it is preferred to start children on chores when they are three, peer influence not being much of a factor.

At three, most children cannot read and, for that reason, any chore chart must show the chores in pictorial form. In the early years, most children also have difficulty following a chore chart with a grid of intersecting lines to record information concerning their performance. If the child cannot understand the chore chart and track his performance against some goal, he will quickly lose interest.

With young children, the order in which a number of tasks should be done is not always clear (e.g., brush your teeth before you get dressed to avoid toothpaste splatters). For them, the chore chart should display the tasks in the order they are to be performed, thus allowing the child to learn proper sequencing.

Parents and caregivers have different ideas concerning how a child should be rewarded for doing chores. Some feel that the child should be paid while others think that money should not be used as an inducement, substituting time with the parent, privileges or other treats as a reward. There are no hard and fast rules as each family is different, with different values, needs and backgrounds and parents have to make their own choices as to what is an appropriate reward. A chore chart should give the parent an opportunity to set the reward in accordance with his or her philosophy about money and responsibility.

In addition to motivating children's chores, other users have needs for keeping track of activities such as medication taking, diet compliance and project racking. A variation of a chore chart suitable for children may find application for other purposes, particularly as it will be highly legible.

SUMMARY OF THE INVENTION

In view of the above, it is an object of the present invention to provide a chore chart that is easy to understand, even by very young children. It is another object to provide a chore chart that allows a parent or caregiver to set the reward. It is also an object to provide a chore chart that can be used for teaching sequencing of tasks. Other objects and features of the invention will be in part apparent and in part pointed out hereinafter.

In accordance with the invention, an education device has a plurality of activity or item cards and a sheet of material with right and left, top and bottom sides. The sheet has a chart on one surface with a plurality of ranks and files, with the ranks on the left and the files on the right.

The ranks are for assigning a plurality of activities or items into at least two different categories with the ranks separated by white space for improved readability, critical for young children. Each of the ranks has means for attaching one or more of the cards, if desired, in a selected left to right order to facilitate sequencing of the performance of the activities on said cards. The files are divided into segments aligned with the ranks, with one file for each unit in a time period (e.g., one file for each day in the week). The files are separated by white space and, in addition, neighboring files are preferably different colors to facilitate reading by young children. The cards represent an activity or item in one or more of the categories, preferably pictorially and in text to facilitate understanding.

The legibility of the device described above that is so advantageous for young children is also useful in other applications and for other users, such as for tracking a medication regimen, diet education and compliance for all ages and project tracking. A variation of the device can be used, for example, to convey instructions given to a babysitter to assure that they are understood.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
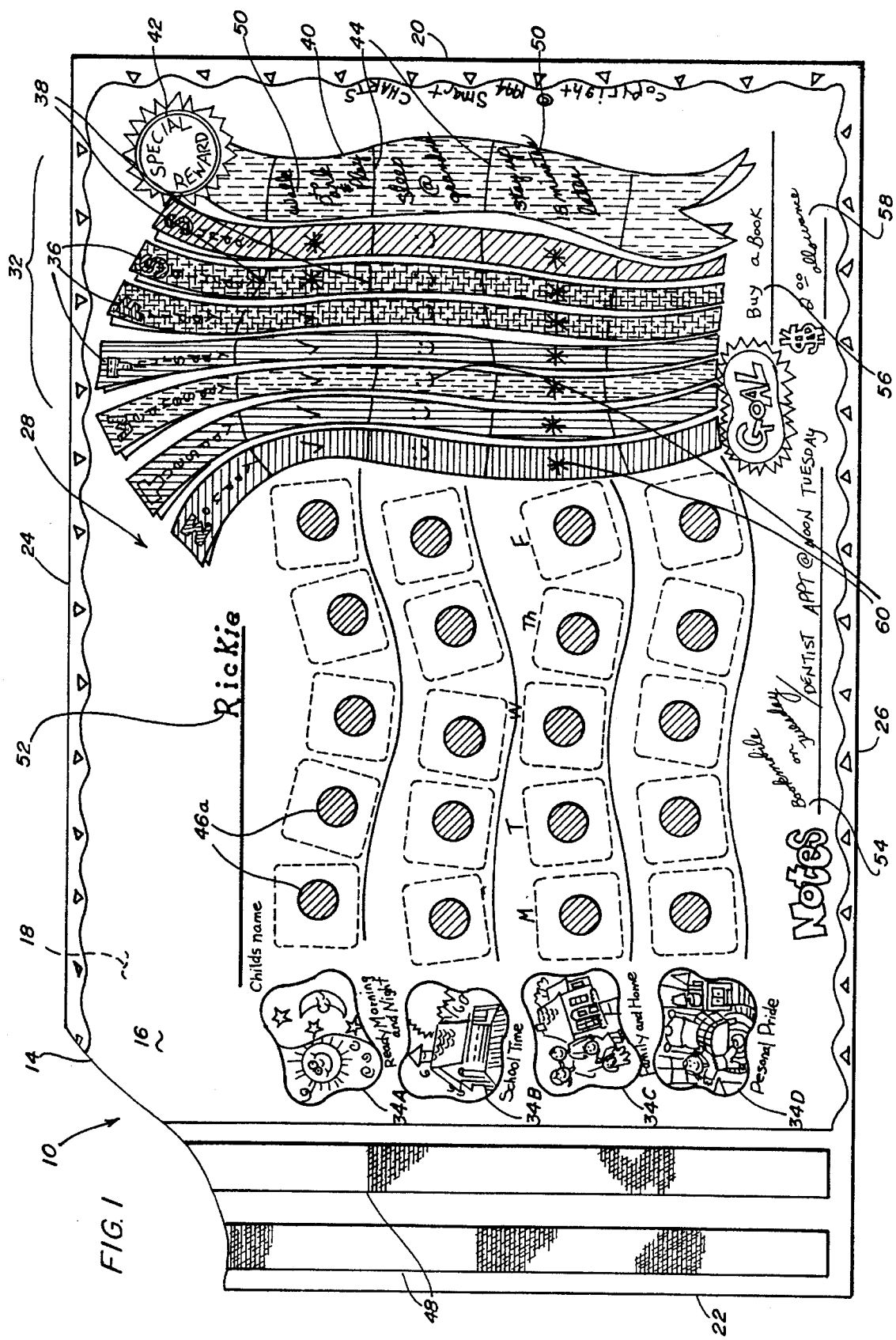
FIG. 1 is a plan view of an educational device in accordance with the present invention with a plurality of ranks and files.

Referring to the drawings more particularly by reference character, reference number 10 refers to an educational device in accordance with the present invention. Device 10 has a plurality of activity or thing cards 12 and a sheet 14 to which they are attached in an organized manner.

Sheet 14 has a front and rear side 16, 18, respectively, is made of a suitable material such as plastic, cardboard, metal, or the like and can be square, circular or any other desired shape. In the form shown, sheet 14 is generally rectangular in form and of uniform thickness throughout. Sheet 14 is preferably a piece of paper upon which information more particularly described below is printed, laminated between two plastic sheets and having a wipe-off surface so that it can be erased and reused. In rectangular form, sheet 14 has right and left sides 20, 22 and top and bottom sides 24, 26, respectively.

A chore chart 28 is formed on front side 16 of sheet 14 with a plurality of ranks 30 and files 32. Ranks 30 are positioned on the left side of sheet 14 and files 32 on the right. At least two ranks are provided, each rank representing a different category 34 of activity or thing, with the ranks separated by white space. White space is the unprinted area surrounding a piece of printing and is critical for readability, particularly for children as young as three, a group for whom device 10 is intended. Referring to FIG. 1, device 10 is illustrated with four ranks 30, representing the following four categories: "Ready Morning and Night" 34A (i.e., activities connected with personal hygiene and room care), "School Time" 34B (i.e., activities associated with getting ready for and going to school and school work), "Family and Home" 34C (i.e., activities related to tasks around the home) and "Personal Pride" 34D (i.e., activities involving things done for fun and acts of courtesy to others). Categories 34A–34D are represented pictorially, for young users, and in text, for older users, their parents and caretakers. The pictorial representations are also provided because they are aesthetically pleasing.

With continuing reference to FIG. 1, one file 32 is provided for each unit of time in a period. In the form illustrated, the period is a week and the individual units are days. Other periods are possible, e.g., hours in a day, months in a year, etc. Time can also be measured by completion of steps, there being a unit for each step in a multi-stepped procedure such as getting dressed, etc. Files 32, like ranks 30, are separated by white space, with each file preferably differing in color from its neighboring files. Titles 36 of the time units are written at the top of each file and files 32 are divided into segments 38 horizontally aligned with ranks 30, one segment for each rank 30. As shown in FIG. 1, an additional file 40 is provided on the far right side of other files 32. File 40 has a title 42 such as "Special Reward" written at the top and is divided into segments 44 aligned with other segments 38 and ranks 30 for use as described below.

Each of ranks 30 has an attachment means 46 for attaching cards 12. Attachment means 46 may be provided in the form of hook and pile fasteners such as are sold under the trademark VELCRO. In the form illustrated in FIG. 1, a row of hook or pile patches 46a are provided at spaced intervals along each rank 30 for mated engagement with patches 46b of opposite gender (see FIG. 3) on the backside of cards 12. Other possible attachment means include paired angled slots for attachment of cards 12 by opposite corners or edges, or reusable adhesives such as are sold under the trademark POST-IT, applied either to the backside of cards 12 or to ranks 30. When cards 12 are made of thin plastic and sheet 14 has an impervious surface, attachment means 46 can be surface tension whereby cards 12 are "magnetically" held in rank. While attachment means 46 can take a variety of forms, hook and pile fasteners are preferred because children, particularly younger ones, are fascinated by the ripping sound they make.

Figure 3:
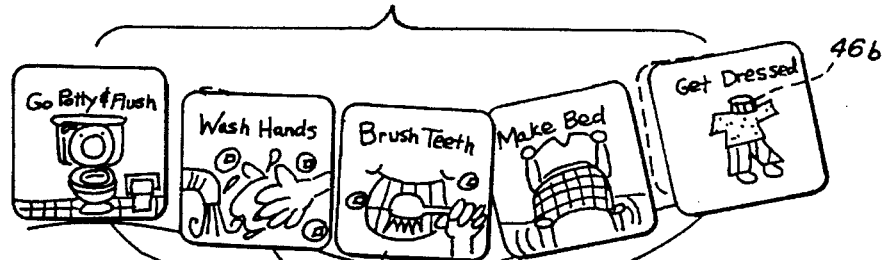
FIG. 3 is a plan view, on a slightly enlarged scale, of the "Ready Morning and Night" rank, filled with activity cards.
Figure 4:
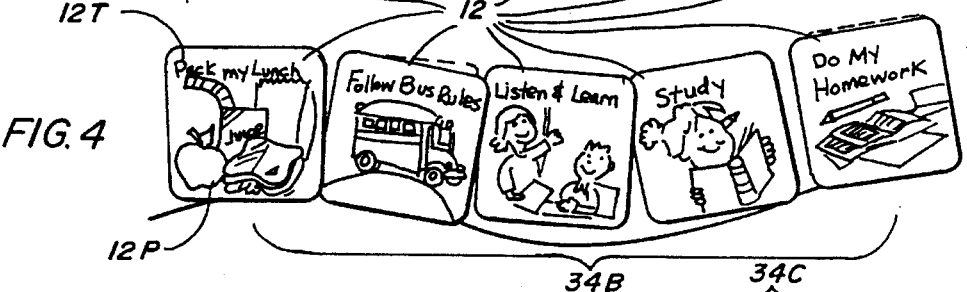
FIG. 4 is a plan view, on a slightly enlarged scale, of the "School Time" rank, filled with activity cards.
Figure 5:
FIG. 5 is a plan view, on a slightly enlarged scale, of the "Family and Home" rank, filled with activity cards; and, FIG. 6 is a plan view, on a slightly enlarged scale, of the "Personal Pride" rank, filled with activity cards.
Figure 6:
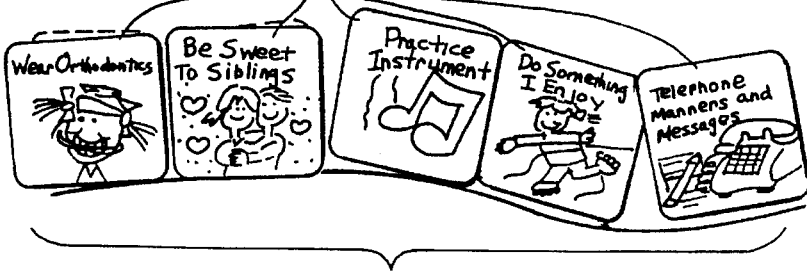

A large number of different cards 12 (e.g., 72) may be sold with device 10, extra ones of which may be stored, for example, on a pair of vertical hook and pile strips 48 provided to the left of ranks 30. Included among cards 12 may be several blank ones upon which other activities, defined by the user, may be illustrated by the user. Each of cards 12 has an activity or thing that fits in one or more of categories 34A–34D represented pictorially 12P and in text 12T on its face. Representative cards 12 describing activities falling in the "Ready Morning and Night" 34A category are shown in FIG. 3. Cards 12 in the "School Time" 34B, "Family and Home" 34C and "Personal Pride" 34D, categories are shown in FIGS. 4, 5 and 6, respectively. In some instances, as will be readily appreciated, the activity described on a card may fit into more than one category, its assignment being somewhat arbitrary, promoting flexibility in the system.

As shown in FIGS. 3 and 4, cards 12 may be arranged on ranks 30 in the order in which the tasks are to be performed. For example in FIG. 3, first card 12 directs a child to "Go Potty & Flush", the second to "Wash Hands" and the third to "Brush Teeth" followed by "Make Bed" and "Get Dressed", it being preferred that the child finish brushing his teeth before getting dressed, etc. FIG. 4 shows a sequence of events pertaining to the "School Time" category.

As shown in FIG. 5, it is not necessary that all activities defined on cards 12 arranged on a rank be performed every day. For example, category 34C "Family and Home" has the letters "M", "T", etc. written above the cards on the rank, indicating that the activity on the first card be done on Monday only and so forth through the week. As will be appreciated by the user, provision for such use further promotes flexibility in the system.

A different reward may be provided for the successful performance of the tasks specified in each rank 30. As shown in FIG. 1, a reward 50 is written in each of segments 44. For example, "walk to park & play" is promised for successful completion of the "Ready Morning and Night" 34A category, "sleep at grandma's" for completing 34B, "staying up 15 minutes later" for completing 34C, etc.

Other users of device 10 may prefer to store extra cards 12 other than on strips 48 so that the strips may be used to store the cards that are in use. Used in this manner, the child can remove the activity card from strips 48 and place it on the appropriate rank 30 as he completes each task. This immediate reward may give the child a better sense of forward progress and accomplishment, which may be needed especially with very young children who may have difficulty understanding deferred rewards. Markings 60 are still used, when all of the activities in each rank are completed, as are the end-of-the-week rewards and long term goals, it being important that even a very young child experience deferred rewards too.

A space 52 may be provided for writing the child's name. Other spaces may be provided for notes 54, a grand "Goal" 56, allowance 58, consequences (e.g., 3 minute time out for a three year old, no TV for a stated period, etc.) may also be displayed on sheet 14.

In the form illustrated, device 10 is designed for use with children age 3–12 as a child-friendly reminder of a child's chores. By transferring the responsibility for doing the chores to the child, the adult will have more time to spend with the child (i.e, quality time). Device 10 may include attachment means (not shown) on rear side 18 of sheet 14 for attachment to a vertical surface such as a refrigerator door or the door to a child's room. Other suitable locations may be appropriate, it being important that device be distinguished from a game.

Figure 2:
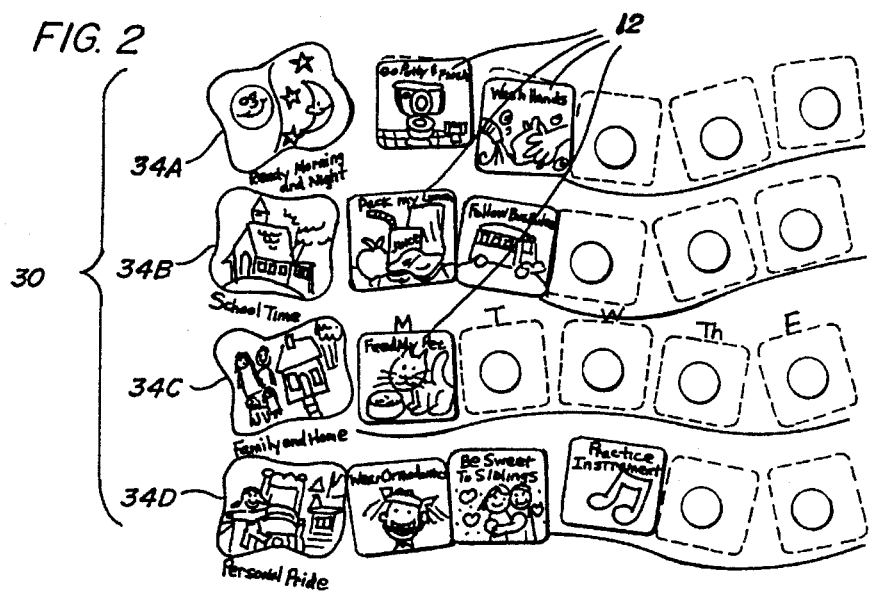
FIG. 2 is a plan view of the left side of the educational device showing four ranks partially filed with activity cards.

At the beginning of each week or other time period, the parent or caregiver should talk about the activities to be done by the child and discuss how they should be done. As shown in FIG. 2, in the beginning it is best to select one or two (or just a few) activities in each category to avoid overwhelming the child. More can be added later. Together, the child and adult should decide what the reward will be. It is up to the parent or caretaker, however, to decide whether it is necessary that all activities (i.e, activities or items on cards 12) on a rank be performed every day to qualify for the promised reward, or if something less than all is required. Whatever the rules, they should be clearly communicated to the child at the start of the time period, otherwise some of the benefit of using device 10 will be undermined, as the child may be discouraged before the chore habit is formed.

When the child completes all the tasks in a rank 30, the adult should reward the child by checking segment 38 to show successful completion of the tasks. As shown in FIG. 1, markings 60, such as checks, stars, happy faces, etc., can be used.

At the end of each unit of time, markings 60 can be erased when sheet 14 is provided with a wipe-off surface. Cards 12 may be changed or other cards added, readying device 10 for another cycle of use. As the child matures, some cards (such as "Go Potty & Flush") will drop out as the habit becomes fixed, while other cards such as "Pack my Lunch" will eventually come into play.

If the child uses device 10 daily, it will minimize hassles and nagging about chores, and both the adult and child will be happier. More importantly, device 10 will instill responsibility, independence and pride by giving children the habit and a love of work.

In view of the above, it will be seen that the several objects of the invention are achieved and other advantageous results attained. As various changes could be made in the above described devices without departing from the scope of the invention, it is intended that all matter contained in the above description or shown in the accompanying drawings shall be interpreted as illustrative and not in a limiting sense.

What is claimed:

1. A motivational task tracking device comprising a plurality of cards and a sheet of material having right and left sides and top and bottom sides, said sheet having a chart on one surface with a plurality of ranks and files, said ranks being on the left side of the sheet for assigning a plurality of items or activities in at least two different categories, said ranks separated by white space, each of said ranks having attachment means for attaching one or more of the cards in a selected left to right order;

said files being on the right side of the sheet, said files being divided into segments aligned with the ranks, one file for each time unit in a period with titles of the time units at the top of each file, said files separated by white space; and, each of said cards representing an item in one or more of the categories.

2. The device of claim 1 wherein there are four ranks into which the following activities are categorized: "Ready Morning and Night", "School Time", "Family and Home" and "Personal Pride".

3. The device of claim 1 wherein attachment means are provided on the sheet for storing cards not attached to the ranks.

4. The device of claim 3 wherein adjacent files are different colors to improve readability.

5. A motivational task tracking device comprising a sheet of material having a wipe-off surface, right and left sides and top and bottom sides, a plurality of activity cards and a chart on one surface of the sheet having a plurality of ranks and files, said ranks being on the left side of the sheet for assigning a plurality of activities in at least two different categories, said ranks separated by white space, each of said ranks having attachment means for attaching one or more of the activity cards;

said files being on the right side of the sheet, said files being divided into segments aligned with the ranks, one file for each time unit in a period with titles of the time units at the top of each file and an additional file to the right of the time files with a reward title at the top of the file, all of said files separated by white space and neighboring files being different colors; and, said activity cards representing the activity to be performed in pictorial and text form, each of said activity cards having attachment means for mating attachment with the attachment means in said ranks.

6. The device of claim 5 wherein there are four ranks into which the following activities are categorized: personal hygiene and room care, getting ready for and going to school and school work, tasks around the home, and things done for fun and acts of courtesy to others.

7. The device of claim 5 wherein the time unit is a week and the titles on the files are the days of the week.

8. The device of claim 7 wherein an attachment strip is provided on the sheet to the left of the ranks for storing cards not attached to the ranks.

\* \* \* \* \*